United States Patent
Roach

[11] 3,877,791
[45] Apr. 15, 1975

[54] DEFORMABLE MIRROR LIGHT VALVE AND METHOD OF MAKING THE SAME

[75] Inventor: William Ronald Roach, Rocky Hill, N.J.

[73] Assignee: RCA Corporation, New York, N.Y.

[22] Filed: Feb. 20, 1974

[21] Appl. No.: 444,098

[52] U.S. Cl............ 350/161; 96/1.1; 340/173 TP; 346/74 TP; 178/6.6 TP
[51] Int. Cl. ................................................ G02f 1/28
[58] Field of Search...................... 350/161; 96/1.1; 178/6.6 R, 6.6 A, 6.6 TP; 340/173 MS, 173 TP; 346/74 TP

[56] References Cited
UNITED STATES PATENTS
3,716,359   2/1973   Sheridon ............................. 96/1.1

*Primary Examiner*—Ronald L. Wibert
*Assistant Examiner*—Paul K. Godwin
*Attorney, Agent, or Firm*—G. H. Bruestle; D. S. Cohen; C. L. Silverman

[57] ABSTRACT

A deformable mirror light valve is improved by providing the deformable mirror light valve with a double layer deformable mirror. The double layer prevents damage to the mirror surface during and after construction.

3 Claims, 2 Drawing Figures

PATENTED APR 15 1975 3,877,791

DEFORMABLE MIRROR LIGHT VALVE AND METHOD OF MAKING THE SAME

BACKGROUND OF THE INVENTION

The present invention relates to a deformable mirror light valve, and particularly to such a light valve having a double layer deformable mirror as its reflective surface.

Deformable mirror light valves are well known devices capable of amplifying the light intensity of an optically projected image, e.g., see U.S. Pat. No. 2,896,507 entitled, "Arrangement For Amplifying The Light Intensity Of An Optically Projected Image", issued to F. Mast et al., July 28, 1959. Generally, the devices are layered structures including a transparent conductor layer, a photoconductor layer, an elastomer layer, a thin flexible layer of conductive metal and a means of applying a voltage across the transparent conductor layer and the flexible layer of conductive metal.

A light image absorbed by the photoconductor layer generates electron-hole pairs. The voltage applied across the transparent conductor layer and the thin flexible metal layer causes the mobile carriers to drift in the photoconductor layer. As the oppositely charged carriers separate, a nonuniform charge pattern is formed, thereby causing the thin flexible metal layer to deform.

Although such a deformable mirror light valve having a single deformable mirror layer, e.g., a silver layer as described in U.S. Pat. No. 3,137,762 entitled, "Arrangement For Amplifying The Brightness Of An Optically Formed Image.", issued June 16, 1964, can be successfully constructed, the inherent structure of such a light valve causes a great number of them to be defective as competing internal stresses develop within the deformable mirror surface wherein the mirror layer often splits during or after construction. It would therefore be desirable to develop a deformable mirror light valve having good optical properties while avoiding the present difficulties.

SUMMARY OF THE INVENTION

A deformable mirror light valve having a transparent substrate and a transparent conductor layer covering one surface of the substrate. A photoconductor layer on the transparent conductor layer and an elastomer layer on the photoconductor layer. The deformable mirror light valve is improved by providing a deformable mirror on the elastomer layer wherein the deformable mirror is a double layer having a first conductive layer capable of adhering to the elastomer layer and providing good optical isolation between the readout light and the addressing light. The second conductive layer of the deformable mirror having properties of good reflectivity and ductility.

DETAILED DESCRIPTION

Figure 1:
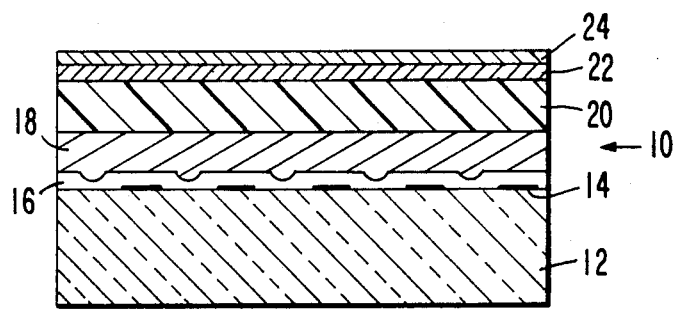
FIG. 1 is a cross-sectional view of one form of a deformable mirror light valve of the present invention.

Referring initially to FIG. 1, one form of a deformable mirror light valve of the present invention is designated generally as 10. The deformable mirror light valve 10 includes a transparent substrate 12, such as pyrex, having an optical grating 14 on one surface thereof. The optical grating 14 need not extend over the entire surface of the transparent substrate 12, it is sufficient if the grating 14 extends over the target area of the deformable mirror light valve, i.e., the area where the image is read in. The transparent conductor layer 16, such as TIC, a thin coating of tin oxide, covers both the grating 14 and the spaces defined by the grating 14. A photoconductor layer 18, such as poly(N-vinylcarbazole) doped with trinitrofluorenone, covers the transparent conductor layer 16. An elastomer layer 20 of an electrical insulator, such as RTV silicone rubber, covers the photoconductor layer 18. The elastomer layer 20 is covered by a deformable mirror including a first conductive layer 22 having the ability to adhere to the elastomer layer 20 and also providing good optical isolation between the readout light and the addressing light, such as gold, and a second conductive layer 24 having good reflectivity and ductility, such as indium.

Figure 2:
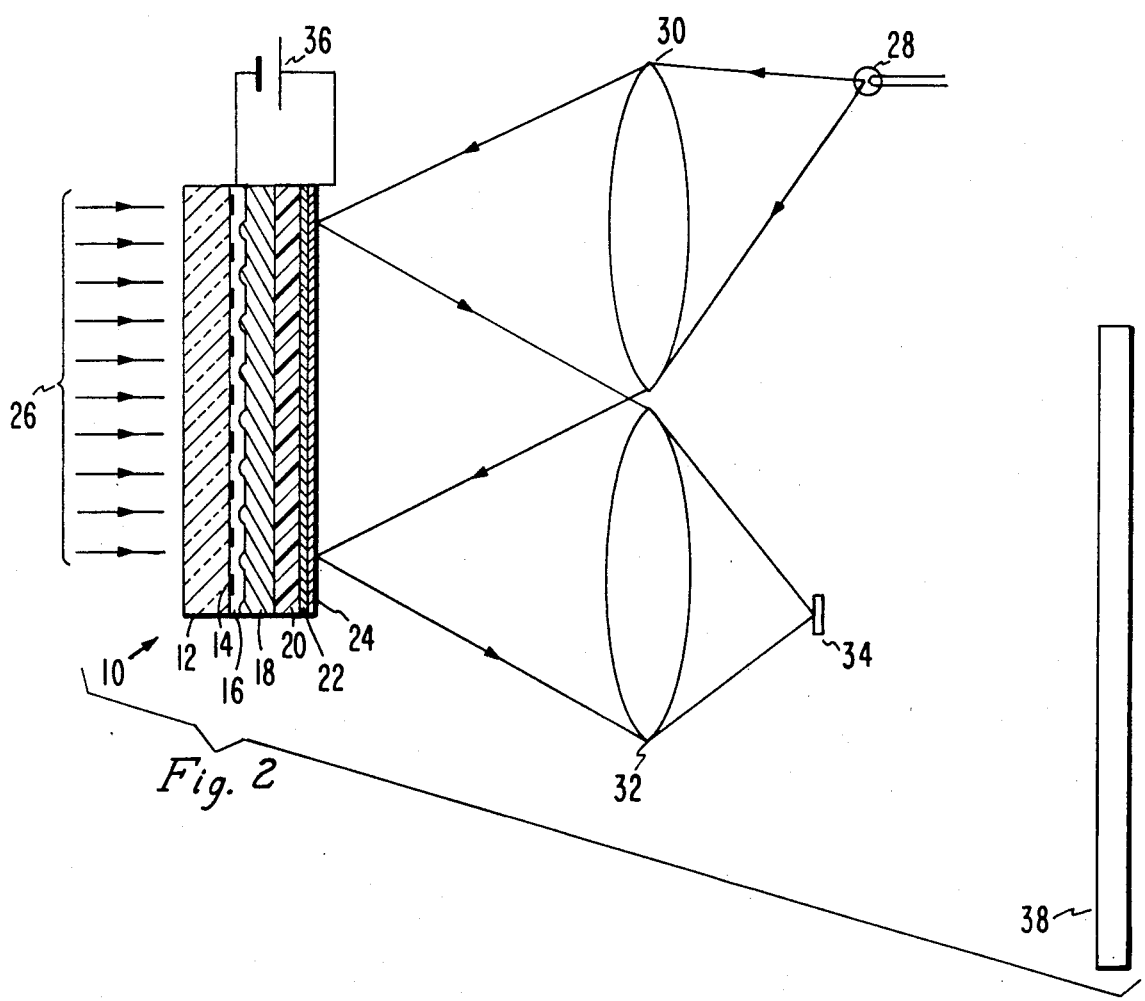
FIG. 2 is one form of a Schlieren optical system suitable for operating the deformable mirror light valve of the present invention.

The operation of the deformable mirror light valve 10, utilizes a Schlieren optical system, known in the art, such as the one described in FIG. 2. The deformable mirror light valve 10 is positioned wherein the addressing light 26 falls incident upon its substrate 12. The Schlieren optical system includes a high intensity projection lamp 28 which emits light toward a condensing lens 30 which then directs parallel light toward the second layer 24 of the deformable mirror light valve 10. The parallel light striking the second layer 24 of the deformable mirror light valve 10 is reflected through a projection lens 32 and focused on a Schlieren stop 34 as long as the parallel light from the condensing lens 30 strikes the second layer 24 while the second layer 24 is flat. A biasing voltage 36 is applied across the transparent conductor layer 16 and the second layer 24 of the deformable mirror light valve 10. At each point where the addressing light 26 strikes the photoconductor layer 18, electron-hole pairs are generated. The pairs are separated by the electric field produced by the biasing voltage 36 thereby causing the second layer 24, the first layer 22 and the elastomer layer 20 of the deformable mirror light valve 10 to deform. Each deformation of the second layer 24 of the deformable mirror light valve 10 causes the light reflected from the deformed second layer 24 to bypass the Schlieren stop 34 and fall upon a viewing screen 38.

The deformable mirror light valve 10 of FIG. 1 can be constructed by forming an optical grating 14 on a flat transparent substrate 12. For example, a chrome grating 14 consisting of lines and spaces of equal width can be formed by conventional methods, e.g., deposited and etched on a pyrex substrate 12. A grating 14 of about 1000 lines per inch is typically chosen as such a grating is easily fabricated and has a spatial frequency most suitable for the results desired. A transparent conductor layer 16 is deposited, e.g., sputtering indium oxide and tin oxide, over both the grating 14 and the spaces included in the grating 14. A photoconductor layer 18, such as poly(N-vinylcarbazole) doped with trinitrofluorenone, is then deposited on the transparent conductor layer 16 from a solution of poly(N-vinylcarbazole) and a suitable solvent such as 1,1,2-trichloroethane, commercially available from Eastman Kodak. An elastomer layer 20 of room temperature curing rubber, such as RTV silicone rubber commercially available from General Electric as RTV 602, is mixed with a diluent and a catalyst and deposited on the photoconductor layer 18. The silicone oil diluent, such as RTV 910, also commercially available from General Electric, is added to the rubber to permit spinning the elastomer layer 20 of 5 to 10 microns thickness on the photoconductor layer 18 without the use of a solvent, as the use of a solvent would interfere with the curing characteristics of elastomer layer 20. The catalyst, such as SRC-04 also commercially available from General Electric, is added in an amount so as to optimize the cure rate of the silicone rubber.

The elastomer layer 20 is then partially cured, e.g., permitted to cure to about one tenth of its ultimate hardness, by adding a predetermined number of drops of the catalyst, before the first conductive layer 22 is deposited. The first conductive layer 22 must provide good optical isolation and have the ability to adhere to the elastomer layer 20, e.g., a gold layer. The first conductive layer 22 can be deposited by evaporation as is well-known in the art. The substrate 12 must be masked during the gold deposition so that the gold layer 22 does not overlap the edges of the substrate 12, otherwise the gold layer 22 will be likely to split rather than shrink back from the edges. The typical gold thickness is 2000 to 3000 Angstroms, hereinafter A, a thickness sufficient to produce an optical isolation of about 1 million between the addressing light 26 and the light incident on the second layer 24 of the deformable mirror light valve 10. After the evaporation of the gold layer 22, the partially constructed deformable mirror light valve 10 is removed from the evaporation chamber and allowed to cure fully. During this final curing period the gold layer 22 shrinks slightly and tends to relieve any internal stresses.

The partially constructed deformable mirror light valve 10 is again placed in an evaporation chamber where the second conductive layer 24, having good reflectivity and ductility, such as an indium layer, is deposited over the first layer 22. By proper choice of the thickness of the second layer 24, e.g., about 1000A, the reflectivity peak can be centered at a projected light 28 having a wavelength of about 5000A. The peak is rather broad and reflectivities greater than 70% are attainable. The layer 24 of indium forms a conductive specular surface which is ductile, yet capable of achieving the reflectivity desired in the deformable mirror light valve 10. The substrate 12 must be adequately heat sinked and the evaporation rates of the gold and indium must be controlled during the construction of the deformable mirror light valve 10 in order to prevent excessive heating of the elastomer layer 20 and damage to the mirror layers 22 and 24.

Although the deformable mirror light valve of the present invention has been described with a direct current (DC) biasing voltage, the deformable mirror light valve can be successfully biased with an alternating current (AC) biasing voltage. With (AC) biasing, in each half cycle the image is read in and then erased in the next half cycle when the electron-hole pairs formed during the first half cycle are swept apart from one another to ultimately recombine. Reversing the biasing voltage causes the carriers to reverse their direction of motion and recombine so rapidly that a new image can also be read in during the second half cycle. Furthermore, the use of an optical grating in the deformable mirror light valve, although preferable, is not essential, as the optical grating can be replaced by writing the image into the light valve in a raster pattern with a scanning beam or merely employing additional optics outside of the deformable mirror light valve.

I claim:

1. A method of constructing a deformable mirror light valve comprising the steps of:
   a. depositing a transparent conductor layer on one surface of a transparent substrate,
   b. depositing a photoconductor layer on said transparent conductor layer,
   c. depositing an elastomer layer on said photoconductor layer,
   d. partially curing said elastomer layer, then
   e. depositing a first conductive layer on said elastomer layer, said first layer providing good optical isolation and having the ability to adhere to said elastomer layer, and
   f. curing said elastomer layer substantially fully,
   g. depositing a second conductive layer on said first layer, said second layer having good reflectivity and ductility.

2. A method in accordance with claim 1 wherein a layer of gold is evaporated on said elastomer layer as said first layer.

3. A method in accordance with claim 2 wherein a layer of indium is evaporated on said gold layer as said second layer.

* * * * *